United States Patent
Uetake et al.

[11] Patent Number: 6,081,403
[45] Date of Patent: *Jun. 27, 2000

[54] TAPE GUIDE MEMBERS FOR A TAPE TRAVEL SYSTEM FOR A TAPE LOADING MECHANISM IN A RECORDING AND REPRODUCING APPARATUS

[75] Inventors: Akihiro Uetake, Kanagawa; Toshio Mamiya, Tokyo; Katsuji Akimoto, Tokyo; Masaki Takase, Tokyo; Katsuaki Ikema, Kanagawa; Kazuyoshi Suzuki; Katsunori Takahashi, both of Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,154

[22] Filed: Apr. 2, 1997

[30] Foreign Application Priority Data

Apr. 9, 1996 [JP] Japan ................................ 8-086834

[51] Int. Cl.⁷ .................................................. G11B 15/665
[52] U.S. Cl. .................................................. 360/85; 360/95
[58] Field of Search ................................. 360/84–85, 95

[56] References Cited

U.S. PATENT DOCUMENTS

| | | | |
|---|---|---|---|
| 5,041,928 | 8/1991 | Sasaki et al. | 360/85 |
| 5,115,361 | 5/1992 | Terayama et al. | 360/85 |
| 5,278,707 | 1/1994 | Tsuchiya et al. | 360/85 |
| 5,321,567 | 6/1994 | Kano et al. | 360/85 |
| 5,369,536 | 11/1994 | Konishi et al. | 360/85 |
| 5,717,539 | 2/1998 | Takada | 360/85 |

FOREIGN PATENT DOCUMENTS

| | | |
|---|---|---|
| 0 083 932 | 7/1983 | European Pat. Off. . |
| 0 104 031 | 3/1984 | European Pat. Off. . |
| 0 104 071 | 3/1984 | European Pat. Off. . |
| 0 127 447 | 12/1984 | European Pat. Off. . |
| 0 361 275 | 4/1990 | European Pat. Off. . |
| 0 442 525 | 8/1991 | European Pat. Off. . |
| 0 554 088 | 8/1993 | European Pat. Off. . |
| 0 674 312 | 9/1995 | European Pat. Off. . |
| 57-191865 | 11/1982 | Japan . |
| 57-212649 | 12/1982 | Japan . |
| 57-212651 | 12/1982 | Japan . |
| 4-205844 | 7/1992 | Japan . |
| 5-36169 | 2/1993 | Japan . |

OTHER PUBLICATIONS

Patent Abstracts of Japan, vol. 007, No. 042, Feb. 19, 1983, of JP 57 191865 A, Nov. 25, 1982.

*Primary Examiner*—Brian E. Miller
*Attorney, Agent, or Firm*—Frommer Lawrence & Haug, LLP; William S. Frommer

[57] ABSTRACT

A tape-loading mechanism of a magnetic recording and reproducing apparatus according to the present invention has a tape travel system in which a magnetic tape drawn out of a supply-side tape reel is helically wound around a drum along a lead thereof by tilted guides respectively provided on inlet and outlet sides of the drum and tape guides respectively provided on inlet and outlet sides thereof, passed via a capstan and wound around a takeup side tape reel. A vertical position of the lead of the drum is set equal to that of a lower edge of the tape in a state immediately before the magnetic tape is loaded onto the drum. The magnetic tape is twisted in the middle of the tape travel system in order to cancel difference in tension between upper and lower edges of the magnetic tape when the magnetic tape is loaded onto the drum.

5 Claims, 2 Drawing Sheets

TAPE GUIDE MEMBERS FOR A TAPE TRAVEL SYSTEM FOR A TAPE LOADING MECHANISM IN A RECORDING AND REPRODUCING APPARATUS

BACKGROUND OF THE INVENTION

1. Field of the Invention

The present invention relates to a recording and reproducing apparatus such as a video cassette recorder (VCR) and more particularly to a tape-loading mechanism for loading a magnetic tape on to a rotary drum according to an M-loading system, for example.

2. Description of the Related Art

FIG. 1 shows a front view of a tape-loading mechanism of a video cassette recorder (VCR) in a state just before a magnetic tape is loaded on a rotary drum in accordance with an M-loading system.

In FIG. 1, a drum 41 is disposed so as to be inclined at a predetermined angle toward a tape-supply side. The drum 41 is formed of a stationary drum 43 having a lead 42 on its peripheral surface and a rotating drum 44 which rotates relative to the stationary drum 43. A tilted guide 46 for winding a magnetic tape T kept in an upright state helically along the lead 42 of the drum 41 through a vertical-direction guide 45 is disposed on a tape-inlet side of the drum 41. A tilted guide 47 for guiding the magnetic tape T which is helically drawn out along the lead 42 and a vertical-direction guide 48 for guiding the magnetic tape T so that the magnetic tape T should be kept in its upright state are disposed on a tape-outlet side of the When the magnetic tape T thus wound around the drum 41 is started being scanned from a lower edge $T_1$ of the magnetic tape T to an upper edge thereof by a magnetic head (not shown) on the tape-inlet side of the drum 41, the operation of writing a video signal of one track amount in the magnetic tape T is started. When the scanning of the magnetic tape T is finished on the tape-outlet side of the drum 41, the operation of writing the video signal of one track amount in the magnetic tape T is finished. The video signal can be reproduced from the magnetic tape T by a reproducing head (not shown) by tracing tracks recorded on the magnetic tape T.

In the aforesaid VCR shown in FIG. 1, immediately before the magnetic tape T is loaded onto the drum 41, the lower edge $T_1$ of the magnetic tape T is located at a position lower than a lead 42a on the outlet side of the drum 41, thereby lying on the lead 42a. Consequently, in the course of winding the magnetic tape T around the drum 41, the lower edge $T_1$ of the tape T is brought in a frictional contact with a drum surface below the lead 42a on the outlet side thereof and then guided by the lead 42a.

Contrary, immediately after the magnetic tape loaded on the drum 41 is unloaded from the drum, the lower edge $T_1$ of the tape T leaves the drum 41 while being subjected to a friction such that it is gripped by the lead 42a on the outlet side.

However, such disadvantage influencing the magnetic tape may hardly damage the edge of the magnetic tape having a comparative thickness, for example, in case of VHS systems and the like. On the other hand, in case of a very thin magnetic tape capable of a long time recording/reproduction, for example, the tape edge is disadvantageously damaged.

SUMMARY OF THE INVENTION

In view of such aspects, it is an object of the present invention to provide a tape-loading mechanism of the recording and reproducing apparatus which, even if the magnetic tape is of the thin type, prevents a tape edge of the magnetic tape from being damaged by a lead of a drum during operations of loading and unloading the magnetic tape onto and from the drum.

According to an aspect of the present invention, a tape-loading mechanism of a magnetic recording and reproducing apparatus has a tape travel system in which a magnetic tape drawn out of a supply-side tape reel is helically wound around a drum along a lead thereof by tilted guides respectively provided on inlet and outlet sides of the drum and tape guides respectively provided on inlet and outlet sides thereof by a tilted guide and a tape guide provided on inlet and outlet sides of the drum, passed via a capstan and wound around a takeup side tape reel. A vertical position of the lead of the drum is set equal to that of a lower edge of the tape in a state immediately before the magnetic tape is loaded onto the drum. The magnetic tape is twisted in the middle of the tape travel system in order to cancel difference in tension between upper and lower edges of the magnetic tape when the magnetic tape is loaded onto the drum.

DESCRIPTION OF THE PREFERRED EMBODIMENT

The tape-loading mechanism of a recording and reproducing apparatus according to an embodiment of the present invention which is applied to a VCR will be described below with reference to accompanying drawings by way of example.

Figure 2:
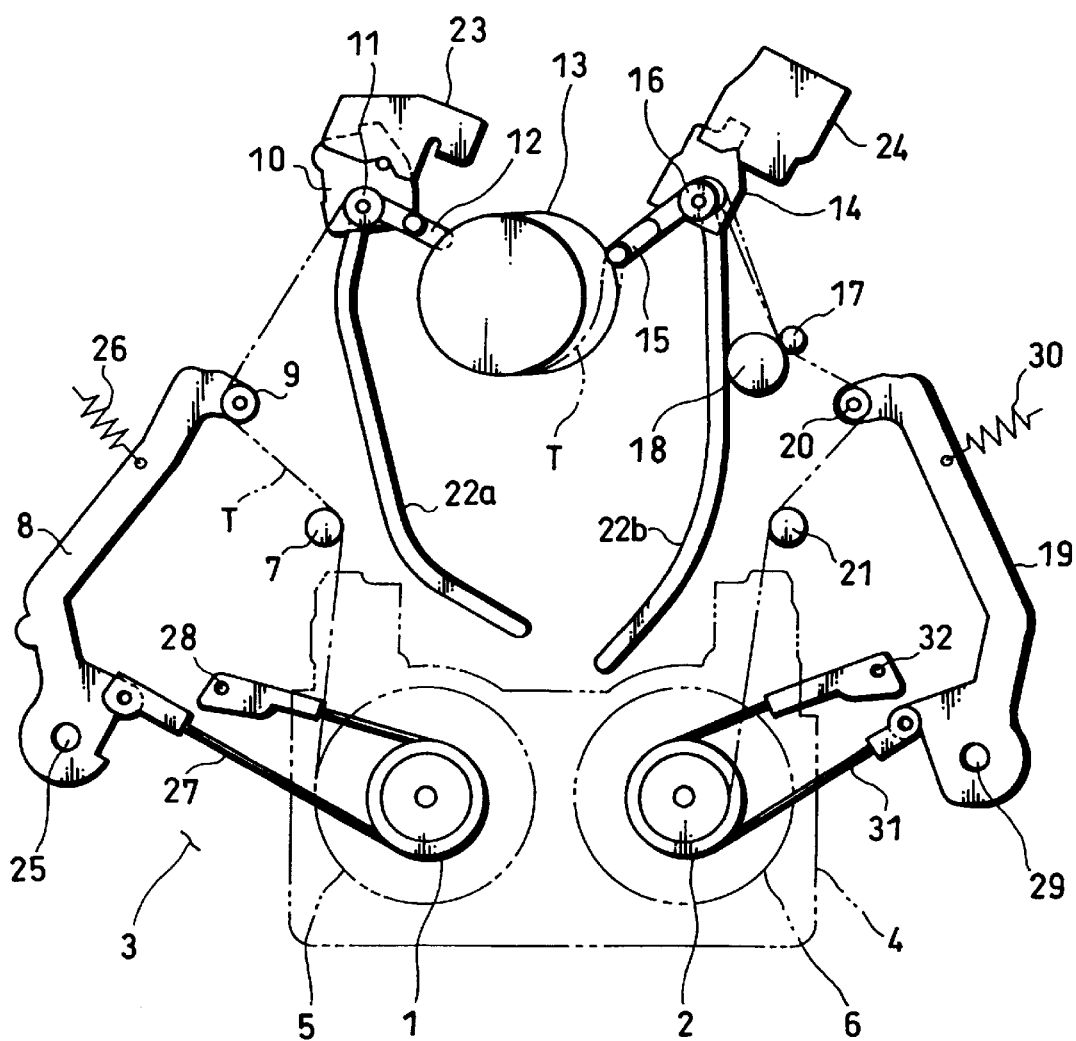
FIG. 2 is a plan view of a tape travel system of a VCR to which a tape-loading mechanism according to the present invention is applied.

A tape travel system of the VCR apparatus will be described with reference to FIG. 2.

A pair of a supply reel hub 1 and a take-up reel hub 2 are disposed on a mechanical chassis 3. A tape supply reel 5 and a tape take-up reel 6 of a tape cassette 4 shown by a phantom line in FIG. 2 are loaded onto these two reel hubs 1 and 2, respectively.

A magnetic tape T drawn out of the tape supply reel 5 is guided and passed through a fixed-type guide roller 7, a guide roller 9 fixed on a supply-side tension regulator arm 8, and a tape guide 11 and a tilted guide 12 supported by a sliding member 10 and is then helically wound around a drum 13 having a magnetic head (not shown) and inclined toward an upstream side of the magnetic tape T along a lead, will be described later on, of the drum 13 from an inlet side of the drum 13. Then, the magnetic tape T is drawn out of the outlet side of the drum 13 and is guided and passed through a tilted guide 15 and through a tape guide 16 supported by a sliding member 14, a capstan 17, a pinch roller 18, and a guide roller 20 of a takeup-side tension regulator arm 19. Further, the magnetic tape T is passed through a fixed-type guide roller 21 and wound around the tape takeup reel 6. Thus, the tape-running system is arranged.

The respective sliding members 10 and 14 can be respectively moved to their unloading positions along sliding grooves 22a and 22b formed on the mechanical chassis 3 by a loading gear (not shown) through a link. The respective sliding members 10 and 14 are positioned by stationary blocks 23 and 24 at their loading positions shown in FIG. 2, respectively.

The supply-side tension regulator arm 8 can be rotated about a fulcrum shaft 25 serving as a rotation fulcrum and applies a backward tension to the magnetic tape T stretched at the guide roller 9 by a coil spring 26. The supply-side tension regulator arm 8 supports one end of a band 27 wound around the supply reel hub 1, while the other end of the band 27 is supported by a fixed pin 28 planted on the mechanical chassis 3.

The takeup-side tension regulator arm 19 can also be rotated around a fulcrum shaft 29 serving as a rotation fulcrum and applies a backward tension to the magnetic tape T stretched at the guide roller 20 by a coil spring 30. The takeup-side tension regulator arm 19 supports one end of a band 31 wound around the takeup reel hub 2, while the other end of the band 31 is supported by a fixed pin 32 planted on the mechanical chassis 3.

An operation of a tape-loading mechanism for loading the magnetic tape T onto the drum 13, of the present invention will be described with reference to FIG. 3.

Figure 3:
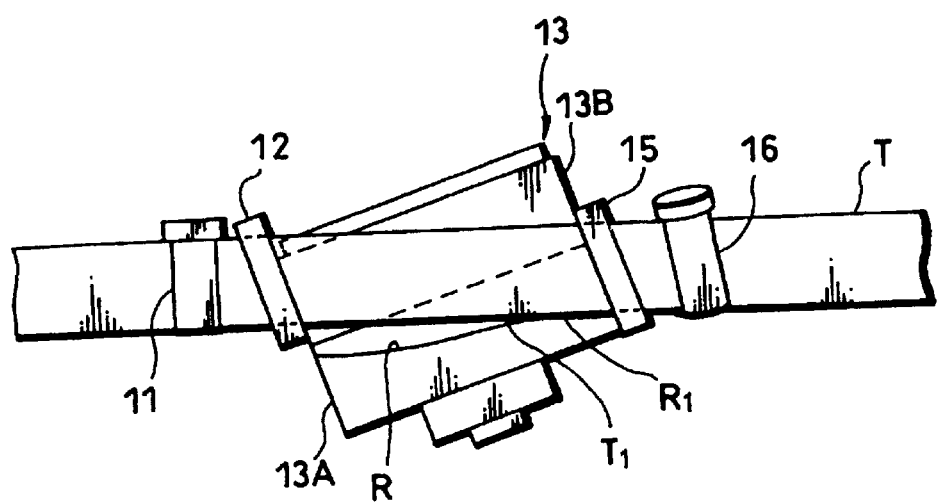
FIG. 3 is a front view of a main part of a tape-loading mechanism according to the present invention in a state just before a magnetic tape is loaded on a rotary drum in accordance with an M-loading system.

FIG. 3 is a front view of the tape-loading mechanism according to this embodiment in a state immediately before the magnetic tape T is loaded onto the drum 13. The drum 13 according to the present invention is formed of a stationary drum 13A having a lead R on its peripheral surface and a rotary drum 13B. The drum 13 is disposed such that the height or level of the lead R provided on the outer periphery of the stationary drum 13A does not overlap a lower edge $T_1$ of the magnetic tape T in a tape path immediately before the tape loading from lying on the lead R. In FIG. 3, the level of the lead R is set to such a level that an outlet side lead $R_1$ of the drum 13 does not overlap the lower edge $T_1$ of the tape T.

Figure 1:
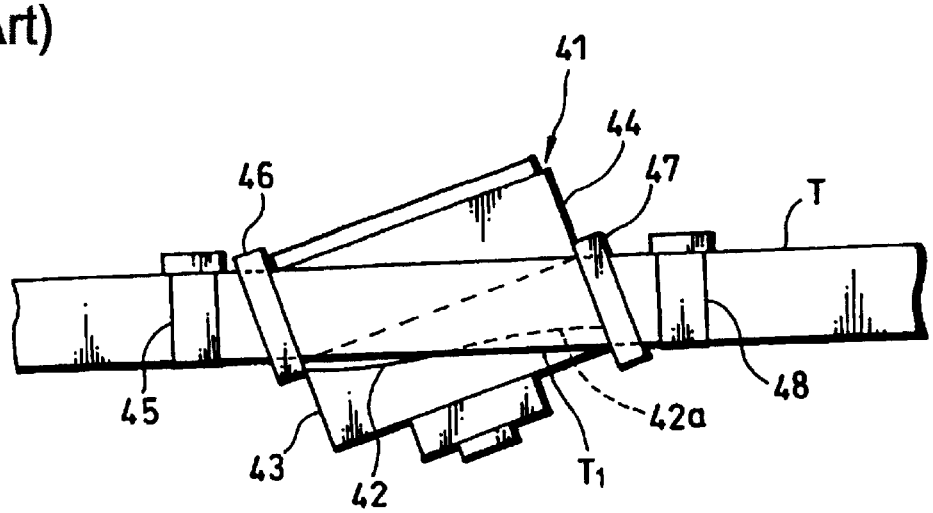
FIG. 1 is a front view of a tape-loading mechanism of a video cassette recorder in a state just before a magnetic tape is loaded on a rotary drum in accordance with an M-loading system.

It is possible to prevent the lead R and the lower edge $T_1$ of the magnetic tape T from overlapping each other, by shifting the drum 13 in a downward direction with the drum 13 being kept in its tilted state as shown FIG. 1, or by inclining the drum 13 kept in a front direction at a predetermined angle with a vertical position of the drum 13 being kept the same.

In order to load the magnetic tape T helically onto the drum surface of the drum 13 kept in the tilted state with the magnetic tape T being uniformly in contact therewith, angles of inclination and directions of inclination of the tilted guides 12, 15 respectively provided at an inlet of the drum 13 and an outlet thereof relative to an inclination angle of the drum 13 are determined based on calculation.

If only the drum 13 is disposed at a lower position, the magnetic tape T is not brought in uniform contact with the surface of the drum 13. Specifically, a tension of an upper edge of the magnetic tape T becomes higher than that of the lower edge $T_1$ thereof, which causes disadvantages which is undesirable in view of recording and reproducing characteristics. At this time, the difference in tension between the upper and lower edge of the magnetic tape T is produced throughout the entire tape path.

Therefore, according to the present invention, in order to cancel the difference in tension between the upper and lower edges of the tape, the magnetic tape is twisted in a direction in which the tension of the upper edge of the magnetic tape T is suppressed and hence made equal to the tension of the lower edge $T_1$ thereof.

The twist may be given at any position in the tape path of the inlet side or the outlet side of the drum 13. However, in this embodiment of the present invention, the magnetic tape T is twisted by using the tape guide 16 on the outlet side of the drum 13.

An advantage of twisting the magnetic tape T by using the tape guide 16 on the outlet side of the drum 13 will be described with reference to FIG. 2. Specifically, if the magnetic tape T is twisted by using the tape guide 11 on the inlet side of the drum 13, the guide roller 9 moved together with the tension regulator arm 8 is provided on the tape upstream side, which provides the unstable effect of the twist. On the contrary, if the magnetic tape T is twisted by using the tape guide 16 on the outlet side of the drum 13, the tape is pressed between the capstan 17 and the pinch roller 18 on the tape downstream side of the drum 13, which can provide the stable effect of the twisted tape.

As described above, according to the tape-loading mechanism of the present invention, when the tape is loaded onto the drum 13, it is possible to load the magnetic tape T onto the drum 13 along the lead R without the lower edge $T_1$ thereof being brought in frictional contact with the outlet-side lead $R_1$ of the lead R. Also, when the tape is unloaded from the drum 13, it is possible to prevent the lower edge $T_1$ of the magnetic tape T from being gripped by the outlet-side lead $R_1$. Since this arrangement of the tape-loading mechanism can prevent the lower edge $T_1$ of the magnetic tape T from being damaged, the tape-loading mechanism according to the present invention is particularly suitable for use with the thin magnetic tape.

While the outlet-side lead $R_1$ of the drum 13 and the lower edge $T_1$ of the magnetic tape overlap each other by an amount of about 1.5 mm in the tape-loading mechanism shown in FIG. 1, the tape-loading mechanism according to the present invention makes it possible to prevent the outlet-side lead $R_1$ and the lower tape edge $T_1$ from overlapping each other or to set the width of the overlapped portion thereof to about 0.4 mm. Therefore, the tape-loading mechanism according to the present invention can prevent the magnetic tape T from being damaged because of its contact with the lead R.

While in this embodiment the vertical position of the outlet-side lead $R_1$ of the drum 13 is set equal to that of the lower edge $T_1$ of the magnetic tape T kept in a state immediately before the loading, the present invention is not limited thereto and a vertical position of an inlet-side lead of the drum 13 or of a lead on a central portion thereof may be set equal to that of the lower edge $T_1$ of the magnetic tape T kept in a state immediately before the loading. In any case, it is necessary to set the vertical highest position of the lead equal to that of the lower edge $T_1$ of the magnetic tape T kept in a state immediately before the loading.

While in this embodiment the magnetic tape T is twisted by using only the tape guide 16 on the outlet side of the drum 13, it is of course possible to twist the magnetic tape T by using both of this tape guide 16 and the inlet-side tape guide 11 half and half.

While in this embodiment the tape-loading mechanism according to the present invention is applied to the VCR, the present invention is not limited thereto and can widely be applicable to other recording/reproducing apparatus for recording and/or reproducing audio signals on and/or from the magnetic tape by using the rotary drum.

As described above, according to the tape-loading mechanism of the recording/reproducing apparatus of the present invention, since the vertical position of the lead R of the drum 13 is set equal to that of the lower edge $R_1$ of the magnetic tape T kept in a state immediately before the magnetic tape T is loaded on the drum 13 and the magnetic tape T is twisted in the middle of the tape travel system in order to cancel the difference in tension between the upper and lower edges of the magnetic tape caused when the magnetic tape T is loaded onto the drum 13, it is possible to prevent the lower edge $R_1$ of the magnetic tape T from being damaged upon the tape-loading and unloading. Therefore, it is possible to achieve an effect in which the tape-loading mechanism is suitable for use with the thin magnetic tape.

Since the outlet-side lead $R_1$ is disposed at the vertical-direction position equal to that of the lower edge $T_1$ of the magnetic tape kept in a state immediately before the tape T is loaded onto the drum 13, it is possible to prevent the magnetic tape T from being easily damaged by the outlet-side lead of the drum 13 upon the tape-loading and unloading.

Moreover, since the magnetic tape T is twisted on the outlet side of the drum 13, it is possible to effectively carry out the operation of twisting the magnetic tape T on the outlet-side of the drum 13 where no movable member is provided on the tape path, as compared with the operation carried out on the inlet side thereof.

Moreover, since the magnetic tape T is twisted on the upstream side of the capstan 17 by using the tape guide 16 provided on the outlet side of the drum 13, it is possible to effectively cancel the difference in tension between the upper and lower edges of the magnetic tape T.

Moreover, since the tape travel system between the drum 13 and the capstan 17 is formed of the two guides, i.e., the tilted guide 15 and the tape guide 16, it is possible to twist the magnetic tape T by using the existing tape path arrangement without any additional tape guide used for twisting the magnetic tape T.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A tape loading mechanism of a magnetic recording and reproducing apparatus having a tape travel system in which a magnetic tape wound from a supply-side tape reel is helically wound around between inlet and outlet sides of an inclined drum along a lead thereof and passed via a capstan and wound around a take-up side tape reel, comprising:

means for setting a highest vertical position of said lead with respect to said inclined drum equal to the vertical position of a lower edge of said tape with respect to said inclined drum immediately before said magnetic tape is loaded onto said drum; and means for twisting said magnetic tape in said tape travel system in order to cancel a difference in tension between upper and lower edges of said magnetic tape when said magnetic tape is loaded onto said drum wherein said twisting means includes only a single tape guide of said tape travel system provided on the outlet side of said drum accomplishes twisting of said magnetic tape so that the highest vertical position of the lead is equal to that of the lower edge of the magnetic tape immediately before the magnetic tape is loaded onto said drum.

2. A tape-loading mechanism of a magnetic recording and reproducing apparatus according to claim 1, wherein at the outlet side of said drum, the vertical position of the lead with respect to said drum is equal to the lower edge of said magnetic tape immediately before said magnetic tape is loaded onto said drum.

3. A tape-loading mechanism of a magnetic recording and reproducing apparatus according to claim 1, wherein said magnetic tape is twisted on an outlet side of said drum.

4. A tape-loading mechanism of a magnetic recording and reproducing apparatus according to claim 1, wherein said twisting means is said tape guide provided on the outlet side of said drum such that said magnetic tape is twisted on an upstream side of said capstan.

5. A tape-loading mechanism of a magnetic recording and reproducing apparatus according to claim 1, wherein said tilted guide member and said tape guide of said tape travel system are provided between said drum and said capstan.

* * * * *